United States Patent [19]

Kato et al.

[11] Patent Number: 4,981,286
[45] Date of Patent: Jan. 1, 1991

[54] APPARATUS USING A FLUID WHOSE VISCOSITY VARIES WITH ELECTRIC CURRENT APPLIED THERETO

[75] Inventors: Kiyoshi Kato, Kasugai; Atsushi Muramatsu, Komaki, both of Japan

[73] Assignee: Tokai Rubber Industries, Ltd., Aichi, Japan

[21] Appl. No.: 470,239

[22] Filed: Jan. 25, 1990

[30] Foreign Application Priority Data

Feb. 1, 1989 [JP] Japan ................. 1-22783

[51] Int. Cl.$^5$ ................. B60K 5/12; F16F 13/00
[52] U.S. Cl. ................. 267/140.1; 267/219; 188/267
[58] Field of Search ......... 267/140.1, 219, 220; 248/550, 636, 562, 638; 180/300, 312, 902; 188/267; 280/707; 123/192 R

[56] References Cited

U.S. PATENT DOCUMENTS

| | | | |
|---|---|---|---|
| 4,721,288 | 1/1988 | Andrä et al. ................. | 267/219 |
| 4,733,758 | 3/1988 | Duclos et al. ................. | 267/140.1 X |
| 4,757,981 | 7/1988 | Härtel ................. | 267/140.1 |
| 4,793,599 | 12/1988 | Ishioka ................. | 267/140.1 |
| 4,861,006 | 8/1989 | Takano et al. ................. | 188/267 |
| 4,880,216 | 11/1989 | Härtel et al. ................. | 267/219 X |

FOREIGN PATENT DOCUMENTS

| | | |
|---|---|---|
| 218202 | 4/1987 | European Pat. Off. . |
| 257932 | 3/1988 | European Pat. Off. . |
| 3731024 | 3/1988 | Fed. Rep. of Germany . |
| 093638 | 4/1989 | Japan ................. 267/140.1 |

OTHER PUBLICATIONS

Patent Abstracts of Japan, vol. 13, No. 300 (M-848)(3648) Jul. 11, 1989, & JP-A-01 93638 (Tokai Rubber Indu. Ltd.) Apr. 12, 1989.

Primary Examiner—Douglas C. Butler
Attorney, Agent, or Firm—Oliff & Berridge

[57] ABSTRACT

An apparatus for performing a function by using a fluid, which includes: a mass of a fluid whose viscosity varies with an electric current applied thereto; a pair of electrodes which are disposed so as to apply the electric current to the mass of the fluid; a device for controlling a voltage to be applied between the pair of electrodes to substantially change the viscosity of the mass of the fluid; and electrically resistive layers each having a predetermined electrical resistance value and covering each of the pair of electrodes, each of the resistive layers consisting of an insulating material having a low electrical conductivity. Thus, the present apparatus is capable of restricting an increase in an electrical current consumed by the mass of the fluid, when an electrical resistance value of the mass of the fluid is lowered due to a rise in an operating temperature of the mass of the fluid.

12 Claims, 2 Drawing Sheets

APPARATUS USING A FLUID WHOSE VISCOSITY VARIES WITH ELECTRIC CURRENT APPLIED THERETO

BACKGROUND OF THE INVENTION

1. Field of the Invention

The present invention relates to an apparatus which performs an intended function by using a fluid whose apparent viscosity varies with an electric current applied thereto. More specifically, the present invention is concerned with a technique for limiting an increase in a current consumed by a power source for the current, which is caused by lowering of a resistance value of the fluid when the fluid temperature is elevated, in order to protect the power source and other peripheral equipments.

2. Discussion of the Prior Art

There is known a so-called electro-rheological fluid or electro-viscous fluid, whose apparent viscosity varies depending on the presence or absence of an electric field applied thereto, or on a magnitude of the electric field. In recent years, such a fluid is employed in various kinds of apparatus, such as a vibration-absorbing system, shock absorber, fluid valve or actuator, in which the viscosity of the fluid is changed as desired by controlling a voltage to be applied thereto. Thus, the apparatus as indicated above is intended to perform various functions by utilizing the characteristic of the fluid. The fluid having the above-described characteristic will be hereinafter referred to as "electro-viscous fluid" when appropriate.

In the apparatus using the electro-viscous fluid, a pair of electrodes are disposed so as to apply an electric current to a mass of the fluid which is present between the electrodes, so that the viscosity of the fluid is changed by controlling a voltage to be applied between the electrodes. However, it is generally recognized that an electrical resistance value of the electro-viscous fluid is suddenly lowered to a great extent when the temperature of the fluid is elevated, whereby the current density of the fluid is increased and the fluid itself generates heat to further elevate the temperature thereof. Consequently, the apparatus suffers from extreme increase in a current cunsumed by the fluid mass or its power source, due to the thus continuously increased temperature of the fluid and the accordingly lowered resistance value of the fluid. In the apparatus in which the temperature of the fluid is likely to be elevated during its use, therefore, the current consumed by the power source is almost unlimitedly increased with the temperature rise of the fluid, resulting in an overloaded state of the power source, and an adverse influence on the power source itself and its peripheral equipments.

SUMMARY OF THE INVENTION

The present invention was developed in view of the above situation. It is therefore an object of the invention to provide an apparatus using the electro-viscous fluid as described above, such as a vibration-absorbing system, shock absorber, actuator or torque transmitting system, which apparatus is capable of effectively avoiding an unlimited increase in an electric current consumed by a power source, which results from a lowered resistance value of the fluid at an elevated operating temperature, thereby preventing the power source from being overloaded and protecting the power source and its peripheral equipments against an adverse influence caused by the overloading.

The above object may be attained according to the principle of the present invention, which provides an apparatus for performing a function by using a fluid, comprising: (a) a mass of a fluid whose viscosity varies with an electric current applied thereto; (b) a pair of electrodes which are disposed so as to apply the electric current to the mass of the fluid; (c) means for controlling a voltage to be applied between the pair of electrodes to substantially change the viscosity of the mass of the fluid; and (d) electrically resistive layers each having a predetermined electrical resistance value and covering each of the pair of electrodes, each the resistive layer consisting of an insulating material having a low electrical conductivity, thereby restricting an increase in an electrical current consumed by the mass of the fluid when an electrical resistance value of the mass of the fluid is lowered due to a rise in an operating temperature of the mass of the fluid.

In the apparatus of the present invention constructed as described above, since the resistive layers having a suitable electrical resistance are interposed between the electrodes which are disposed so as to apply an electric current to the fluid, the maximum value of the current consumed by the fluid or the power source can be limited based on the relatively high electrical resistance of the resistive layers, even if the electrical resistance value of the fluid is considerably lowered as the fluid temperature is elevated. Accordingly, if the resistance value of the resistive layers, that is, the thickness of these layers, is determined so that the consumed electric power of the power source which provides the maximum current value is limited within the nominal capacity of the power source, the power source is effectively prevented from being overloaded due to the increase in the consumed electric power which results from a lowered resistance value of the fluid. Thus, the power source and its peripheral equipments are free from adverse influences caused by the overloading, whereby the reliability of the apparatus can be greatly improved.

Since the maximum consumed current, i.e., the maximum electric power consumed by the power source, can be limited by appropriately determining the resistance value of the resistive layers, as described above, the power source used in the apparatus of the present invention can be made small-sized with comparatively small rated capacity. Further, the instant apparatus can avoid a great increase in the current density of the fluid when the fluid temperature is elevated, and thereby prevent the fluid from generating heat due to the increased current density, which leads to thermal runaway of the fluid. Moreover, since a voltage applied to the fluid can be substatially lowered with a decrease in the resistance value of the fluid, the apparent viscosity of the fluid can be considerably stabilized, permitting the instant apparatus to stably perform its intended function.

According to the present invention, the electrodes are covered with the respective electrically resistive layers, and therefore, are prevented from contacting the electro-viscous fluid. Accordingly, the electrodes are not likely to be corroded by water or aqueous component contained in the fluid, nor are they likely to be worn by their contact with the flowing fluid. Thus, the life expectancy of the electrodes, and accordingly that of the apparatus, can be considerably improved.

According to one feature of the apparatus of the invention, the means for controlling a voltage changes the voltage from a first value to a second value to increase the viscosity of the mass of the fluid. In this case, the first value of the voltage may be zero.

According to another feature of the invention, the resistance value of the resistive layers is 0.1-10 times, more preferably 1-5 times, that of the fluid at a maximum operating temperature thereof.

According to still another feature of the invention, the insulating material is selected from the group consisting of thermoplastic resins, thermosetting resins, varnish, mica and ceramics.

BRIEF DESCRIPTION OF THE DRAWINGS

The above and optional objects, features and advantages of the invention will become more apparent by reading the following detailed description of presently preferred embodiments of the invention, when considered in conjunction with the accompanying drawings, in which.

DETAILED DESCRIPTION OF THE PREFERRED EMBODIMENT

To further clarify the present invention, there will be described in detail one preferred embodiment of the invention when applied to an engine mount for an automotive vehicle, referring to the accompanying drawings. The instant engine mount is capable of effectively damping or isolating both engine idling vibrations and engine shakes, which have the same frequency range but should be damped or isolated based on different characteristics of the mount, by controlling the electric field acting on an electro-viscous fluid filling the enclosed space in the engine mount. The term "electro-viscous fluid" is used to mean a fluid whose viscosity increases with an increase in the magnitude of the electric field applied thereto.

Figure 1:
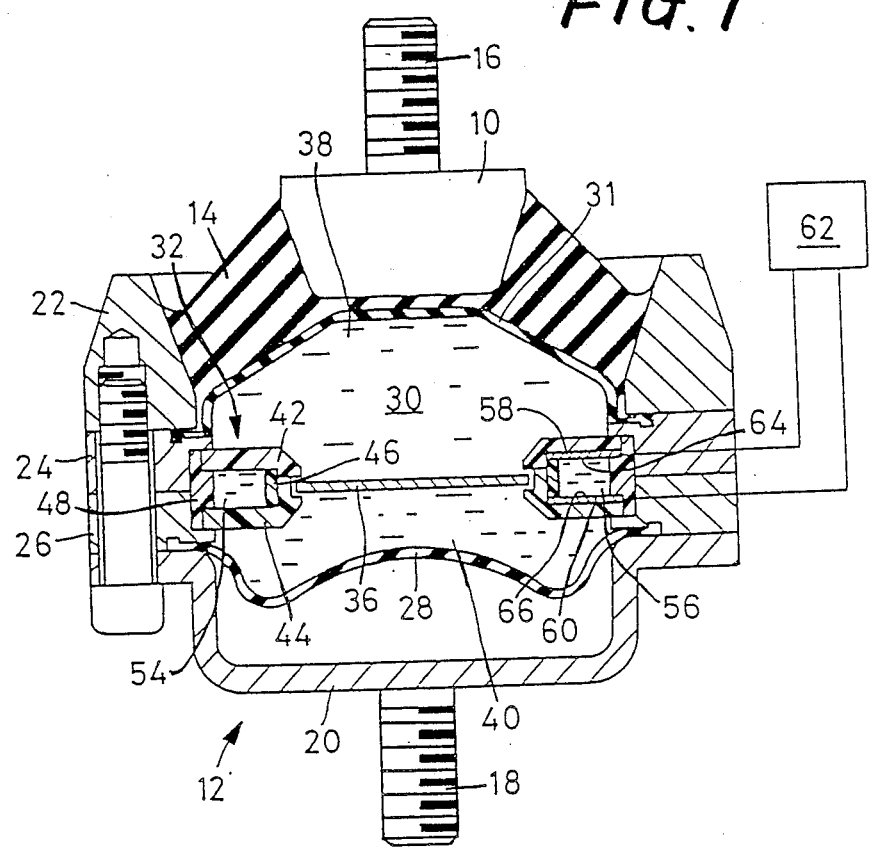
FIG. 1. is an elevational view in vertical cross section of an engine mount for an automotive vehicle, as an example of an apparatus using an electro-viscous fluid according to the present invention.

Referring first to FIG. 1, reference numeral 10 denotes an upper first support member made of metal, which assumes a generally truncated conical shape, while reference numeral 12 denotes a generally cylindrical lower second support member made of metal, which is closed at one end and is open at the other end toward the upper support member 10. These upper and lower support members 10, 12 are disposed coaxially with each other, such that the members 10, 12 face each other in a vertical direction as seen in FIG. 1. An annular elastic body 14 made of a rubber material is interposed between the upper and lower support members 10, 12 so as to elastically connect these members 10, 12. To the upper surface of the upper support member 10, there is secured a mounting bolt 16 for fixing the upper support member 10 to a power unit including the vehicle engine. On the other hand, another mounting bolt 18 is provided extending from a bottom wall portion of the lower support member 12, so as to fix the lower support member 12 to the vehicle body.

The lower support member 12 consists of a hat-shaped metal member 20 forming its bottom portion, a tapered metal member 22 forming its upper end portion, and two annular spacer members 24, 26 interposed between these members 20, 22. A flexible diaphragm 28 made of a rubber material is disposed such that its outer peripheral portion is fluid-tightly gripped by and between the hat-shaped metal member 20 and the lower spacer member 26. Between the flexible diaphragm 28 and the elastic body 14, therefore, there is formed a fluid-tightly enclosed space, which is filled with a suitable electro-viscous fluid 30 whose viscosity substantially varies with the intensity of the electric field applied thereto.

In FIG. 1, reference numeral 31 denotes a protective rubber layer made of NBR, for example, whose outer peripheral portion is fluid-tightly gripped by and between the tapered metal member 22 and the upper spacer member 24, so that the entire area of the inner surface of the elastic body 14 is covered with the protective rubber layer 31 secured thereto. This protective rubber layer 31 serves to prevent the elastic body 14 from being affected by the fluid 30.

Within the fluid-tightly enclosed space filled with the fluid 30, there is disposed an annular orifice defining structure 32 whose outer peripheral portion is fluid-tightly fitted in recesses formed in the adjacent spacer members 24, 26. Further, a disk-like movable plate 36 is disposed such that its outer peripheral portion is supported in an annular groove formed in the inner circumferential surface of the orifice defining structure 32, so that the movable plate 36 is displaceable by a predetermined distance in the axial direction of the mount in which vibrations are applied. Thus, the fluid-tightly enclosed space filled with the fluid 30 is divided by the movable plate 36 into a pressure-receiving chamber 38 formed on the side of the elastic body 14, and an equilibrium chamber 40 formed on the side of the flexible diaphragm 28. Namely, the orifice defining structure 32 and the movable plate 36 cooperate with each other to constitute means for dividing the enclosed space into the pressure-receiving chamber 38 and the equilibrium chamber 40.

Figure 2:
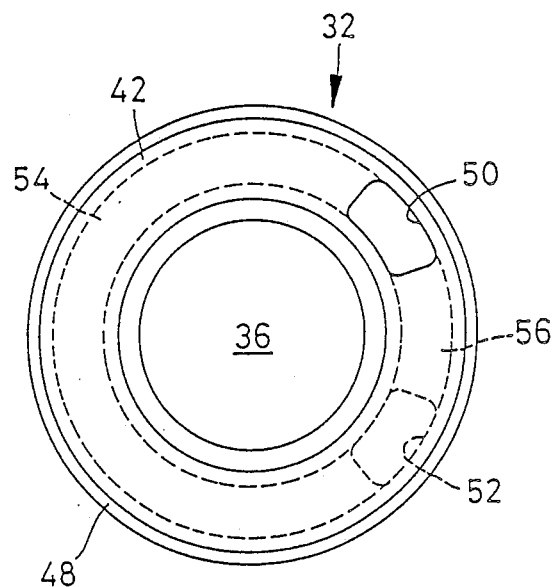
FIG. 2 is a plan view showing an assembly of an orifice defining structure and a movable plate of the engine mount of FIG. 1.

The orifice defining structure 32 supporting the movable plate 36 consists of an upper orifice member 42, a lower orifice member 44, an annular inner sealing member 46 and an annular outer sealing member 48, which are integrally assembled together and cooperate with each other to define an annular space therein. Each of these members 42, 44, 46, 48 of the orifice defining structure 32 is made of an electrically insulating material which is substantially insulated from the fluid 30, such as a fluorine-contained resin. The insulating material for the orifice defining structure 32 usually has a volume resistivity not lower than about $10^{15}\Omega$ cm, and is highly resistant to organic solvents. The orifice defining structure 32 is provided with two communication holes 50, 52, which are respectively formed through the upper and lower orifice members 42, 44 at different circumferential positions thereof, as shown in FIG. 2. Thus, the annular space indicated above is divided into a first orifice passage 54 and a second orifice passage 56, which have different circumferential lengths and each of which communicates with the pressure-receiving chamber 38 and equilibrium chamber 40. Upon application of vibrations to the engine mount, the fluid 30 is caused to flow between the pressure-receiving chamber 38 and the equilibrium chamber 40, through the first or second orifice passage 54, 56, as described below. It will be understood that the communication holes 50, 52 define the circumferential lengths of the two passages 54, 56.

Within the second orifice passage 56 which is shorter than the first orifice passage 54, a pair of plate-like electrodes 58, 60 are disposed on the opposite inner surfaces of the upper and lower orifice members 42, 44, as shown in FIG. 1, such that the mutually facing electrodes 58, 60 are spaced apart from each other by a predetermined distance, and extend over the substantially entire circumferential length of the second orifice passage 56. These plate-like electrodes 58, 60 are electrically connected to a voltage applying device 62 which includes a power source, so that a suitable high DC voltage is applied between the electrodes 58, 60, when needed.

Figure 3:
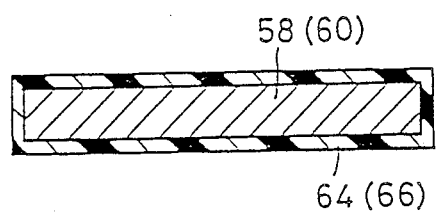
FIG. 3 is a cross sectional view explaining the structure of each electrode used in the engine mount of FIG. 1.

Referring next to FIG. 3, the electrodes 58, 60 are covered by respective electrically resistive layers 64, 66 having the same thickness and a predetermined electrical resistance value. Each of the resistive layers 64, 66 is made of an insulating material having a low degree of electrical conductivity, such as thermosetting resin (e.g., phenol resin), thermoplastic resin, insulating varnish, mica or ceramic. In this arrangement, the amount of current consumed by the fluid or power source 62, i.e., the amount of consumed electric power, can be restricted to within a predetermined capacity of the power source 62, based on the electrical resistance of the resistive layers 64, 66, even if the electrical resistance value of the fluid 30 is considerably lowered as the temperature of the fluid 30 is elevated. The resistive layers 64, 66 are respectively formed on the electrodes 58, 60, in a manner suitable for the materials of the resistive layers 64, 66 and the electrodes 58, 60.

In the engine mount constructed as described above, while no voltage is applied between the electrodes 58, 60, no electric field acts on a mass of the fluid 30 accommodated within the second orifice passage 56, whereby the viscosity of the fluid 30 within the orifice passage 56 remains relatively low, i.e., at the nominal value, which is the same as that of a mass of the fluid 30 accommodated within the first orifice passage 54. Consequently, the fluid 30 is caused to flow mainly through the relatively shorter second orifice passage 56, which has a smaller resistance to fluid flows than the first orifice passage 54.

When a voltage is applied between the electrodes 58, 60, on the other hand, the viscosity of the fluid 30 considerably increases with the increase in the intensity of the electric field acting thereon, whereby the second orifice passage 56 provides a considerably increased resistance to the fluid flows therethrough. Consequently, the fluid 30 is caused to flow mainly through the relatively long first orifice passage 54 whose fluid flow resistance is smaller than the second orifice passage 56.

In the instant engine mount, therefore, the orifice passage 54, 56 through which the fluid 30 passes can be selected as required, by regulating the voltage applied between the electrodes 58, 60. In the present embodiment, the first orifice passage 54 is tuned to a frequency range (around 10-30 Hz) of the engine idling vibrations and engine shakes, while the second orifice passage 56 is tuned to a frequency range higher than the frequency range indicated above. In operation, the power source of the device 62 is turned on for applying a voltage to the electrodes 58, 60 while the vehicle is running, and is turned off with no voltage applied between the electrodes 58, 60 while the vehicle is in the engine idling operation. In this manner, the instant engine mount is adapted to provide a comparatively low damping characteristic and a comparatively high dynamic spring constant while the vehicle is in the engine idling operation, thereby effectively isolating the engine idling vibrations. Further, the engine mount is adapted to provide a comparatively high damping characteristic and a comparatively low dynamic spring constant while the vehicle is running, thereby effectively damping the engine shakes. Thus, the instant engine mount is capable of exhibiting excellent damping and isolating effects, with respect to the engine idling vibrations and engine shakes, which have the same frequency range but should be damped or isolated based on different characteristics of the engine mount.

The instant engine mount can also effectively isolate vibrations in a relatively high frequency range, such as booming noises, based on displacement of the movable plate 36 in the axial direction of the mount.

It is generally recognized that the electrical resistance value of the fluid 30 is extremely lowered as the temperature of the fluid 30 rises, for example, lowered by two or more digits as compared with that when the fluid 30 has the normal operating temperature. Accordingly, without the resistive layers 64, 66 provided on the electrodes 58, 60, the electrical resistance between the electrodes 58, 60 would be considerably lowered due to a rise of the operating temperature of the fluid 30. Consequently, the output current of the power source (62) (current consumed by the power source) is considerably increased and the consumed voltage of the power source exceeds its nominal capacity, resulting in an overloading of the power source which may cause damage to the power source (voltage applying device 62) and its peripheral equipments.

In the engine mount according to the instant embodiment, however, the resistive layers 64, 44 are disposed so as to cover the respective electrodes 58, 60, so that the electrical resistance of the layers 64, 66 exists between the electrodes 58, 60, as described above. Accordingly, even if the electrical resistance value of the fluid 30 is considerably lowered with the temperature rise of the fluid 30, the electrical resistance between the electrodes 58, 60, that is, load resistance of the power source, never becomes lower than that of the resistive layers 64, 66, and the output current (consumed current) of the voltage applying device 62 is limited to the current value which is determined by the resistance value of the layers 64, 66. Accordingly, the power source is effectively prevented from being overloaded due to otherwise extremely increased output current thereof, and therefore, the power source and its peripheral equipments are free from damage caused by the overloading.

Since the maximum consumed current (maximum consumed electric power) of the power source of the voltage applying device 62 is determined by the electrical resistance value of the resistive layers 64, 66 as described above, it is not necessary to increase the nominal capacity of the power source in view of a great increase in its output current, whereby the power source (62) can be made small-sized, with a relatively small rated capacity. Further, the limitation of the maximum consumer current as described above is effective to avoid an unlimited increase in the current density of the fluid 30, and to prevent the fluid from generating heat due to the increase of its current density, thereby avoiding thermal runaway of the fluid. Moreover, since the voltage applied to the fluid 30 is substantially lowered with a decrease in the resistance value of the fluid 30, the instant engine mount is advantageous for its greatly improved stabilities in the apparent viscosity of the fluid 30, and consequently in its vibration damping and isolating characteristics, when the voltage is applied to the fluid 30 at a considerably high temperature.

In the engine mount of the present embodiment, the surfaces of the electrodes 58, 60 are covered by the respective resistive layers 64, 66, in order for the electrodes 58, 60 not to directly contact the fluid 30. Accordingly, the electrodes 58, 60 are not likely to be corroded in a short time of use, without being affected by water contained in the fluid 30. Also, the electrodes 58, 60 are not likely to be worn by their contact with finely divided particles contained in the fluid 30. Thus, the life expectancy of the electrodes 58 are greatly improved, leading to accordingly improved life expectancy of the engine mount.

A desirable resistance value of the resistive layers 64, 66 varies depending upon the characteristics of the fluid 30 or other factors. If the resistance value of the layers 64, 66 is extremely large, however, the ratio of the voltage applied to the resistive layers 64, 66 is greatly increased at the nominal operating temperature of the fluid 30. This is unfavorable because the power source must provide an extremely increased output voltage so as to apply a sufficient voltage to the fluid 30 at the normal operating temperature. If the resistance value of the resistive layers 64, 66 is extremely small, on the other hand, it is difficult to sufficiently restrict the consumed current of the power source, when the resistance value of the fluid 30 is lowered with the temperature rise thereof. Normally, the resistance value of the resistive layers 64, 66 is set to be about 0.1-10 times, more preferably, about 1-5 times the electrical resistance value of the fluid 30 between the electrodes 58, 60 at the maximum operating temperature of the fluid 30. In practice, the thickness of each of the resistive layers 64, 66 is determined so as to adjust the resistance value of the layers 64, 66 to within the above-described range.

While the present invention has been described in its presently preferred embodiment, for illustrative purpose only, it is to be understood that the invention is not limited to the details of the illustrated embodiment, but may be embodied with various other changes, modifications and improvements, which may occur to those skilled in the art, without departing from the spirit and scope of the invention defined in the appended claims.

For example, it is not essential that the resistive layers 64, 66 have the same thickness as in the illustrated embodiment. Further, the resistive layers 64, 66 may be made of different insulating materials. It is also possible to provide the resistive layers 64, 66 only on the mutually facing surfaces of the respective electrodes 58, 60.

It is also to be understood that the present invention is not limited to the engine mount constructed as described above, but may be applied to other types of engine mount which uses the electro-viscous fluid, or to various kinds of apparatus using the electro-viscous fluid, such as a shock absorber, fluid valve, actuator or torque transfer system.

What is claimed is:

1. An apparatus for performing a function by using a fluid, comprising:
    a mass of a fluid whose viscosity varies with an electric current applied thereto;
    a pair of electrodes which are disposed so as to apply said electric current to said mass of the fluid;
    means for controlling a voltage to be applied between said pair of electrodes to substantially change said viscosity of said mass of the fluid; and
    electrically resistive layers each having a predetermined electrical resistance value and covering each of said pair of electrodes, each said resistive layer consisting of an insulating material having a low electrical conductivity, thereby restricting an increase in an electrical current consumed by said mass of the fluid when an electrical resistance value of said mass of the fluid is lowered due to a rise in an operating temperature of said mass of the fluid.

2. An apparatus according to claim 1, wherein said means for controlling a voltage changes said voltage from a first value to a second value to increase the viscosity of said mass of the fluid.

3. An apparatus according to claim 2, wherein said first value of said voltage is zero.

4. An apparatus according to claim 1, wherein the resistance value of said resistive layers is 0.1-10 times that of said fluid at a maximum operating temperature thereof.

5. An apparatus according to claim 1, wherein the resistance value of said resistive layers is 1-5 times that of said fluid at a maximum operating temperature thereof.

6. An apparatus according to claim 1, wherein said insulating material is selected from the group consisting of thermoplastic resins, thermosetting resins, varnish, mica and ceramics.

7. An apparatus according to claim 1, further comprising:
    a first support member and a second support member;
    an elastic body elastically connecting said first and second support members to each other, said elastic body cooperating with said support members to define an enclosed space;
    means for dividing said enclosed space into a pressure-receiving chamber and an equilibrium chamber which are filled with the fluid; and
    orifice-defining means for defining an orifice which communicates with said pressure-receiving and equlibrium chambers, such that said fluid flows through said orifice means between said pressure-receiving and equilibrium chambers upon application of vibrations between said first and second support members,
    said pair of electrodes being disposed so as to define part of said orifice.

8. An apparatus according to claim 7, wherein said orifice consists of a first orifice passage, and a second orifice passage having a smaller length of flow of said fluid therethrough than said first orifice passage, said pair of electrodes partially defining said second orifice passage.

9. An apparatus according to claim 8, wherein said first orifice passage is tuned so as to effectively damp large-amplitude vibrations having frequencies within a range of 10-30 Hz when said voltage is applied to said pair of electrodes by said means for controlling a voltage, while said second orifice passage is tuned so as to effectively isolate small-amplitude vibrations having frequencies higher than said range when no voltage is applied to said pair of electrodes.

10. An apparatus according to claim 9, wherein said first and second orifice passages cooperate with each other to define a circular orifice, and said means for defining orifice means includes a first communication hole communicating with one of said pressure-receiving and equilibrium chambers, and a second communication hole communicating with the other of said chambers, said first and second communication holes being located so as to define lengths of said first and second orifice passages.

11. An apparatus according to claim 7, wherein said means for dividing said enclosed space includes said means for defining an orifice.

12. An apparatus according to claim 11, wherein said means for dividing said enclosed space further includes a movable plate disposed inside said means for defining orifice means, said movable plate being movable in a direction in which said vibrations are applied between said first an second support members.

* * * * *